United States Patent

Tesar

[15] 3,699,668
[45] Oct. 24, 1972

[54] INSTRUCTIONAL DEVICE WITH INTERCHANGEABLE INDICIA CARDS

[72] Inventor: Ian A. Tesar, 53 River Road, Cos Cob, Conn. 06807

[22] Filed: Feb. 19, 1971

[21] Appl. No.: 116,771

[52] U.S. Cl. .................................................. 35/9 D
[51] Int. Cl. ............................................. G09b 7/06
[58] Field of Search ................... 35/9 D, 35 D, 31 C

[56] References Cited

UNITED STATES PATENTS 2,943,399   7/1960   Davis .......................... 35/9 D
2,997,793   8/1961   Kelly ........................... 35/9 D

*Primary Examiner*—Wm. H. Grieb
*Attorney*—Alfred E. Miller

[57] ABSTRACT

An instructional device or educational toy having a series of question and answer cards that are interchangeable on a portable console having spaced push buttons that selectively actuate an electrical signal system. The cards have a metallic tape or a metallic imprint on the rear, hidden side of the card directly under a corresponding correct push button whereby, when the correct push button is pushed, the signal system is made operative.

10 Claims, 5 Drawing Figures

PATENTED OCT 24 1972      3,699,668

INVENTOR.
IAN A. TESAR

INSTRUCTIONAL DEVICE WITH INTERCHANGEABLE INDICIA CARDS

The present invention relates to an instructional device or an educational toy having a question and answer format with changeable cards on a battery-operated portable console.

An object of the present invention is to provide an instructional device or educational toy having interchangeable, electrically sensitized answer cards whereby when the correct push button is pushed, a circuit is made and an electrical signal system is activated.

A further object of the present invention is to provide an educational toy that is portable, battery-operated, and inexpensive and simple to construct.

Another object of the present invention is to provide a compact instrument device or educational toy which has a visual signal and an optional audio alarm.

An object of the present invention is to provide an instructional device that is reliably effective for the purposes intended.

The present invention will now be more fully described with reference to the accompanying drawings in which.

DESCRIPTION OF THE PREFERRED EMBODIMENT

Figure 1:
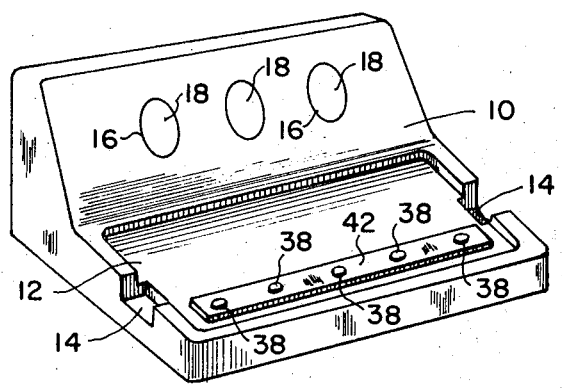
FIG. 1 is a perspective view of the instructional device constructed in accordance with the teachings of the present invention.

Referring to the drawings, the instructional device comprises a base member or console 10 preferably fabricated from a plastic material and provided with a generally rectangular dished out portion 12 having grooves 14 on opposite sides thereof. The function of grooves 14 will be explained more particularly hereinafter. The console 10 is provided with openings 16 through which lamps 18 radiate.

Figure 5:
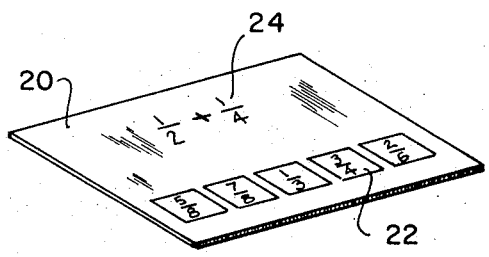
FIG. 5 is a view of an interchangeable card use with the device of FIG. 1.

The instructional device utilizes a series of cards 20 each of which has a question and answers printed thereon, as shown in FIG. 5. In this case, five possible answers 22 are provided for the question 24. The correct answer 22 on card 20 has secured to the rear surface of the card directly behind the correct answer a metallic layer 26 which may be in the form of a metallic tape bonded to the rear surface thereof or a metallic imprint. Moreover, a normally open electric circuit 27 is provided with in the console 10 wherein a multiplicity of dry cells 28 are shown.

Figure 2:
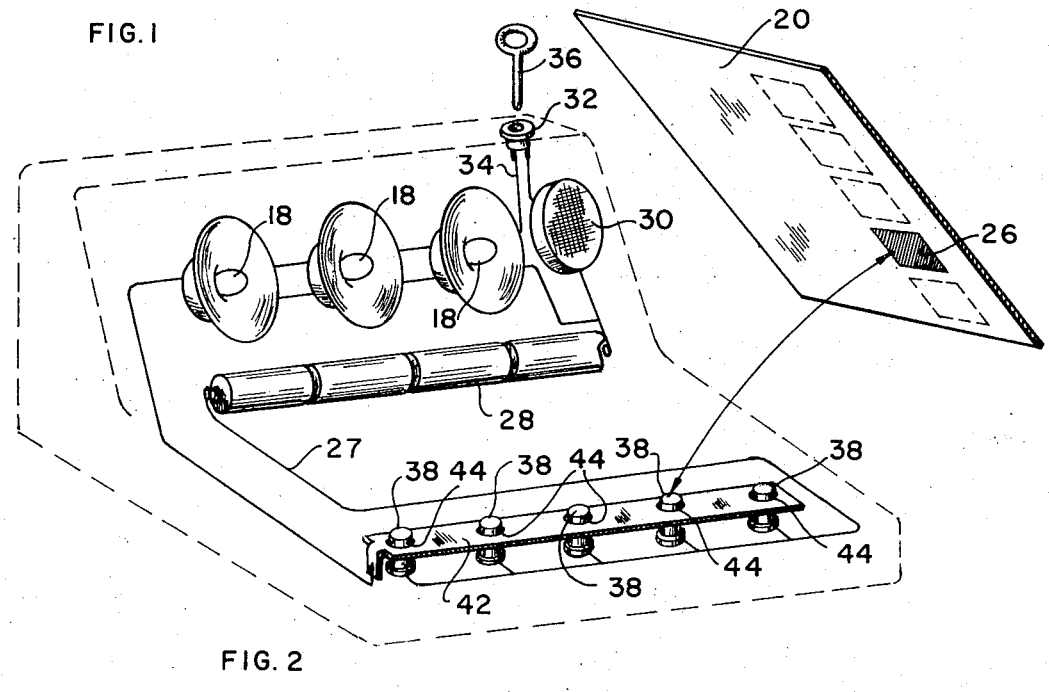
FIG. 2 is a perspective of the device, with parts deleted, in order to illustrate the electric circuit and battery power supply.

As seen in FIG. 2, the instructional device is provided with an audio alarm 30 which sounds when the lamps 18 radiate. However, if it is desired to eliminate the audio alarm in the system, a connector 32 can be removed from the line 34 by means of key 36.

Figure 3:
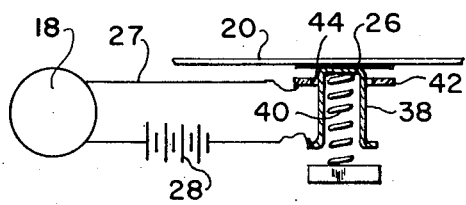
FIG. 3 is a diagrammatic view showing a push-button in cross-section and the card with the metallic layer in an elevated, non-depressed condition.
Figure 4:
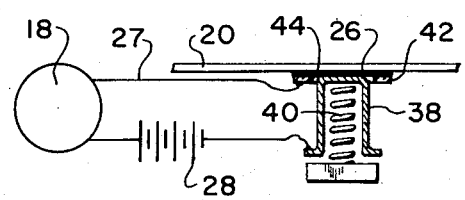
FIG. 4 is a diagrammatic view shown in FIG. 3 with the push-button depressed and electrical circuit in the device completed thereby actuating the signal system.

The metallic push buttons 38 shown in FIGS. 1 – 4 are provided with coil springs 40 which bias the push buttons upwardly. The push buttons 38 project through spaced openings 40 in an elongated metal strip 42, each having a gap 44 therebetween. Thus, when a card 20 is placed in the dished-out portion 12 of the console 10 the answers for the questions are positioned on the card respectively above the corresponding push button 38 with the correct answer having a metallic layer 26 directly underneath and overlaying the push button 38 (FIG. 3). As seen in FIG. 4, when the correct push button 38 is depressed the metallic layer 26 on the underside of the card 20 bridges the gap 44 between the metallic push button 38 and the adjacent edge of the metal strip 42, and thereby completes the circuit having a battery power supply 28 and lamps 18. In this manner the lamps light up, and, if desired, the audio alarm sounds. Of course, if the incorrect push button 38 is depressed the circuit is not made and neither the visual signal nor the audio alarm is activated.

It should be noted that grooves 14 permit the insertion of fingers under the card 20 in dished out portion 12 of the console 10 to thereby permit the ready removal of the card.

What is claimed is:

1. An instructional device comprising a base member, a plurality of spring biased metallic push buttons mounted in spaced relationship on said base member, an elongated metal plate provided with corresponding spaced openings through which said buttons project with a gap between said buttons and the adjacent edges of said metal plate, a plurality of indicia bearing interchangeable cards in the form of questions and answers, each of said cards being placed on said base member and having a metallic layer on a predetermined location on the undersurface of each of said cards which overlays the correct push button when said card is in position on said base member, and an electrical signal system, including a circuit that is normally open, said circuit being closed when said card and correct push button is pushed, said circuit closing being effected by means of said metallic layer bridging said gap between the correct metallic push button and the adjacent edge of said metal plate.

2. An instructional device as claimed in claim 1 wherein said electrical signal system is a visual light.

3. An instructional device as claimed in claim 1 wherein said electrical signal system is both a visual light and an audio alarm.

4. An instructional device as claimed in claim 1 wherein said metallic layer is a strip of metallic tape bonded to the back of each of said cards under the answer forming the correct response.

5. An instructional device as claimed in claim 1 wherein said metallic layer is a metallic imprint on the back of each of said cards under the answer forming the correct response.

6. An instructional device as claimed in claim 1 wherein said electrical signal system includes a battery power source and said base member is a portable console.

7. An instructional device as claimed in claim 6 wherein said console is provided with side notches whereby said interchangeable cards may be easily grasped and removed.

8. An instructional device as claimed in claim 1 wherein said metallic push buttons are each biased in a direction away from said elongated metal plate.

9. An instructional device as claimed in claim 1 wherein said electrical signal system is an audio alarm.

10. An instructional device as claimed in claim 3 further comprising means for disconnecting said audio alarm from said circuit.

* * * * *